US011809169B2

(12) United States Patent
Oroel et al.

(10) Patent No.: US 11,809,169 B2
(45) Date of Patent: Nov. 7, 2023

(54) ELECTRONIC DEVICE FOR AN INDUSTRIAL ELECTRICAL INSTALLATION, AND A COMMUNICATION MODULE, METHOD, AND COMPUTER PROGRAM THEREFOR

(71) Applicant: WAGO Verwaltungsgesellschaft mbH, Minden (DE)

(72) Inventors: Stefan Oroel, Minden (DE); Christoph Meier, Weyhe (DE)

(73) Assignee: WAGO Verwaltungsgesellschaft mbH, Minden (DE)

(*) Notice: Subject to any disclaimer, the term of this patent is extended or adjusted under 35 U.S.C. 154(b) by 11 days.

(21) Appl. No.: 17/378,109

(22) Filed: Jul. 16, 2021

(65) Prior Publication Data
US 2022/0026883 A1    Jan. 27, 2022

(30) Foreign Application Priority Data
Jul. 16, 2020    (DE) .................... 20 2020 104 113.4

(51) Int. Cl.
G05B 19/418    (2006.01)
H04L 41/0806    (2022.01)
(Continued)

(52) U.S. Cl.
CPC ..... *G05B 19/4185* (2013.01); *G05B 19/4183* (2013.01); *G05B 19/41865* (2013.01);
(Continued)

(58) Field of Classification Search
CPC ............ G05B 19/4185; G05B 19/4183; G05B 19/41865; H04L 41/08; H04L 41/0806;
(Continued)

(56) References Cited

U.S. PATENT DOCUMENTS 7,082,340 B2    7/2006 Fehrer et al.
11,093,518 B1*    8/2021 Lu ........................ G06F 11/3476
(Continued)

FOREIGN PATENT DOCUMENTS

DE    10243782 A1    3/2004
DE    102017004689 A1    11/2018

*Primary Examiner* — Michael Won
(74) *Attorney, Agent, or Firm* — Muncy, Geissler, Olds & Lowe , P.C.

(57) ABSTRACT

An electronic device for an industrial electrical installation, having at least one electrical equipment and a communication module. The electrical equipment has control electronics with a memory and the memory of the control electronics comprises a parameter memory in which operating parameters of the electrical equipment are stored, and the communication module has a memory and is set up for data communication with the control electronics of the electrical equipment via a first communication link and for data communication with an external computer device via a second communication link. the memory of the control electronics of the electrical equipment stores a metadata record which contains access information and display information. The access information enables the communication module to access the individual operating parameters stored in the parameter memory and the display information describes the intended display of the individual operating parameters stored in the parameter memory within a user interface.

27 Claims, 4 Drawing Sheets

(51) Int. Cl.
   *H04L 41/0853* (2022.01)
   *H04L 41/08* (2022.01)
   *H04L 41/22* (2022.01)
   *H04L 41/00* (2022.01)

(52) U.S. Cl.
   CPC .......... *H04L 41/08* (2013.01); *H04L 41/0806* (2013.01); *H04L 41/0853* (2013.01); *H04L 41/00* (2013.01); *H04L 41/22* (2013.01)

(58) Field of Classification Search
   CPC ..... H04L 41/0853; H04L 41/00; H04L 41/22; Y04S 40/00
   See application file for complete search history.

(56) References Cited

U.S. PATENT DOCUMENTS

| | | | |
|---|---|---|---|
| 2007/0171047 A1* | 7/2007 | Goodman | G01S 5/0072 340/539.13 |
| 2012/0226786 A1 | 9/2012 | Nekkar et al. | |
| 2016/0226732 A1* | 8/2016 | Kim | H04W 4/70 |
| 2018/0288468 A1* | 10/2018 | Yamagishi | H04N 21/4345 |
| 2018/0335820 A1 | 11/2018 | Halter | |

\* cited by examiner

ELECTRONIC DEVICE FOR AN INDUSTRIAL ELECTRICAL INSTALLATION, AND A COMMUNICATION MODULE, METHOD, AND COMPUTER PROGRAM THEREFOR

This nonprovisional application claims priority under 35 U.S.C. § 119(a) to German Patent Application No. 20 2020 104 113.4, which was filed in Germany on Jul. 16, 2020, and which is herein incorporated by reference.

BACKGROUND OF THE INVENTION

Field of the Invention

The present invention relates to an electronic device for an industrial electrical installation, comprising at least one electrical equipment and a communication module, wherein the electrical equipment has control electronics with a memory and the memory of the control electronics comprises a parameter memory in which operating parameters of the electrical equipment are stored, and the communication module has a memory and is set up for data communication with the control electronics of the electrical equipment via a first communication link and for data communication with an external computer device via a second communication link.

Furthermore, the invention relates to a communication module of an electronic device for an industrial electrical installation which is set up for data communication via a first communication link with control electronics of an electrical equipment, wherein the control electronics of the electrical equipment has a memory, and the memory of the control electronics comprises a parameter memory in which operating parameters of the electrical equipment are stored, and is set up for data communication with an external computer device via a second communication link.

Furthermore, the invention relates to a method of operating an electronic device for an industrial electrical installation, wherein the electronic device comprises at least one electrical equipment and one communication module, and the electrical equipment has control electronics with a memory and the memory of the control electronics comprises a parameter memory in which operating parameters of the electrical equipment are stored, and the communication module has a memory and is set up for data communication with the control electronics of the electrical equipment via a first communication link and for data communication with an external computer device via a second communication link.

In addition, the invention relates to a computer program adapted to perform such a method when the computer program is executed by a computer.

Description of the Background Art

The electrical equipment may in particular be an electrical equipment for an industrial electrical installation and/or for an industrial controller, in particular for a programmable logic controller.

Such electrical equipment can be, in particular, an electrical energy supply device for the electrical energy supply of electrical components from an energy source, for example a power supply unit or an uninterruptible power supply (UPS). However, the electrical equipment can also be, for example, an electronic circuit breaker or a measuring transducer. This will be discussed in detail later.

Electrical equipment of this type, such as those used in modern industrial control systems, often offer the user a wide range of functions and extensive configuration options. In addition, these devices offer the user the possibility of accessing detailed and diverse information on the current operating state of the electrical equipment and its configuration state.

The associated operating parameters of the electrical equipment are stored in its parameter memory. The operating parameters can include configurable and/or non-configurable operating parameters. Operating parameters can in particular be parameters for defining the functionality of the electrical equipment. By means of such parameters certain details of the functions of the electrical equipment can be read out by the user and/or configured as required and/or adapted to a particular application.

It is often desirable to be able to access the operating parameters of the electrical equipment stored in the parameter memory remotely. For this purpose, the communication module of the electronic device according to the invention is set up for data communication with the control electronics of the electrical equipment via a first communication link and for data communication with an external computer device via a second communication link.

The first communication link can, for example, be a Modbus connection, i.e., a communication link based on the Modbus protocol. The first communication link can be, for example, in particular a Modbus/RTU connection. However, the first communication link may also be, for example, a Modbus/TCP link. The second communication link can, for example, be an Ethernet connection (IEEE 802.3).

According to the invention, in this way the communication module allows for data communication between the electronic device, in particular the control electronics of the electrical equipment, and the external computer device.

The external computer device can basically be any computer, e.g., a laptop or a PC. The external computer device may also be a control device of a programmable logic controller or any other device of such a programmable logic controller. The external computer device may be a device connected to a data bus. For this purpose, the electronic device may be coupled to the data bus via the communication module.

The wide range of functions, the diverse configuration options, and the large number of operating parameters of the electrical equipment available for read and/or write access mean that a user interface must be provided for read and/or write access to the electrical equipment that is powerful and as convenient as possible so as to enable effective monitoring, diagnostics, configuration, and control of the electrical equipment.

At the same time, electrical equipment have—as compared with, for example, the IT hardware commonly used in computer networks today—a very low computing power and very low memory capacity, which considerably restricts the options for implementing a convenient and powerful user interface. To overcome this problem, it would be conceivable, for example, to equip the control electronics of the electrical equipment with more powerful hardware, e.g., with a higher computing power and a larger memory—such a measure would, however, be associated with other disadvantages because it would result in higher production costs on the one hand and higher power consumption of the electrical equipment on the other.

DE 10 2017 004 689 A1, which corresponds to US 2018/0335820, which is incorporated herein by reference, describes a power supply, i.e., a power supply unit for supplying voltage to a load, which is supplied with a mains voltage on the input side and has an electrical energy store in order to be able to ensure the voltage supply to the load even if the mains voltage temporarily falls below a critical threshold value. The power supply has a communication unit that is set up to determine or receive measured values with respect to the energy store and to transmit data derived therefrom to the load. This data can signal, for example, that the energy store is functioning without error and/or whether the energy store is fully charged.

SUMMARY OF THE INVENTION

It is therefore an object of the present invention to provide an improved electronic device which allows for simple, convenient, and comprehensive access to the operating parameters of the electrical equipment and at the same time permits the use of simple hardware with low computing power and small memory size for the electrical equipment.

It is thus proposed that, in an electronic device for an industrial electrical installation of the type mentioned above a metadata record is stored in the memory of the control electronics of the electrical equipment, which metadata record contains access information and display information, wherein the access information enables the communication module to access the individual operating parameters stored in the parameter memory and the display information describes the intended display of the individual operating parameters stored in the parameter memory within a user interface, and the communication module is arranged to receive the metadata record via the first communication link and to read the access information and the display information from the metadata record, and the communication module is set up to query a number of operating parameters from the parameter memory of the control electronics by means of the access information via the first communication link and to store the queried operating parameters in the form of parameter data in the memory of the communication module, and the communication module is configured to store the display information in the form of display data in the memory of the communication module.

The metadata record has a predefined syntax and semantics for describing the access information and the display information. The access information enables the communication module to access the individual operating parameters stored in the parameter memory. With the help of the display information, it is possible for the communication module and/or the external computer device to represent the operating parameters within a user interface in a predetermined manner.

For example, the user interface may take the form of at least one web page or part of a web page.

The communication module is set up to read out the access information and the display information from the metadata record. For this purpose, the communication module knows the syntax and semantics of the metadata record.

Furthermore, the communication module is set up to use the access information to query operating parameters from the parameter memory of the control electronics of the electrical equipment and to store them in the form of parameter data in the memory of the communication module. The communication module can be set up in particular to query and store one or more operating parameters cyclically in the manner mentioned. This is particularly advantageous if the queried operating parameters relate to state information of the electrical equipment that can change over time.

The parameter data describing the queried operating parameters and the display data describing the display information are stored in the memory of the communication module so that the communication module and/or the external computer device and/or another device can access this data.

The electronic device according to the invention advantageously enables simple, powerful, convenient, and comprehensive access to the operating parameters of the electrical equipment in order to monitor, control and/or configure the electrical equipment and to integrate it into complex industrial electrical installations with a high degree of automation. This is particularly beneficial for use in connection with comprehensively digitized industrial systems as are generally summarized under the term "Industry 4.0".

Another important advantage of the invention is that these powerful access options to the operating parameters of the electrical equipment can be provided without having to increase the computing power or the memory capacity of the electrical equipment. Rather, it is sufficient to provide the metadata record in the memory of the control electronics of the electrical equipment and to enable the communication module access to the metadata record. The metadata record can, for example, take the form of a simple character string stored in the memory of the control electronics.

With the knowledge of the specified syntax and semantics of this metadata record, the communication module can extract the access information and the display information from the metadata record. The access information can include, for example, memory addresses of the parameter memory of the control electronics, under which the respective operating parameters of the electrical equipment are stored. Knowing the memory addresses, it is then possible for the communication module to query the operating parameters from the parameter memory of the control electronics. On the one hand, the display information can comprise information about the intended structure of the display of the operating parameters within the user interface, but on the other hand it can also comprise handling information about the operating parameters, e.g., a designation of the respective operating parameter, a data type of the respective operating parameter, a unit of measurement of the respective operating parameter and/or an operating parameter identifier and/or similar handling information.

A further advantage of the invention is that the modular concept of the electronic device, which provides for a division of functionality between the electrical equipment and the communication module, means that the electrical equipment can also be used in a conventional manner in an industrial electrical installation without a communication module and without the communication functionality provided by the communication module. This allows for the user to use the communication module and its functionality specifically where it is desired and, e.g., also to retrofit existing electrical equipment accordingly. In principle, it is not necessary to intervene in the hardware of the electrical equipment for this purpose; it is sufficient to store the metadata record in the memory of the control electronics of the electrical equipment and to allow the communication module read access to the metadata record. Therefore, it is even possible in principle to retrofit existing electrical equipment by means of a software and/or firmware update.

The communication module can be arranged to transmit the queried operating parameters or a part thereof, via the second communication link and using the parameter data and the display data, in a display corresponding to the display information to the external computer device.

The communication module can, for example, be set up to generate the user interface, wherein the operating parameters are displayed within the user interface in accordance with the display information. Via the second communication link, the external computer device can then access this user interface, for example, and thus the operating parameters, in a display corresponding to the display information.

The communication module can be arranged to generate the user interface by means of the parameter data and the display data, wherein the operating parameters are displayed within the user interface in accordance with the display information.

Such further developments of the invention, in which the queried operating parameters are transmitted to the external computer device in the aforementioned manner and/or are displayed within the user interface, offer the advantage that a user is provided with read and/or write access to the operating parameters. In this context, the access may be provided via the external computer device, for example a conventional PC and/or a conventional notebook. The second communication link may thereby be part of a conventional computer network, e.g., an Ethernet network (IEEE 802.3). In this way, it is possible for the user to remotely monitor and configure the electrical equipment by means of the external computer device.

The communication module can be set up to receive and evaluate a configuration command transmitted via the second communication link from the external computer device for configuring at least one configurable operating parameter, and to write to the parameter memory of the control electronics of the electrical equipment by means of the access information via the first communication link and configure the configurable operating parameter in accordance with the configuration command.

Such a further development of the invention offers the advantage that the user can be provided with a convenient and powerful means of configuring the electrical equipment remotely. In particular, it is also possible in this way to configure a plurality of electrical equipment via a single external computer device. This is particularly advantageous if the industrial electrical installation in which the electronic device according to the invention is used is particularly large and complex and therefore requires the use of a large number of electrical equipment.

In another advantageous further development of the invention, it is provided that the user interface is designed as at least one web page and the communication module comprises a web server arranged for data communication with the external computer device via the second communication link, and the communication module is adapted to store the parameter data and the display data in a format readable by the web server in the memory of the communication module, and the web server is set up to read in the parameter data and the display data and, by means of the parameter data and the display data, to generate the at least one web page which reproduces the operating parameters or a part thereof in a display corresponding to the display information, and the web server is set up to transmit the at least one web page to the external computer device.

Such a further development of the invention offers the advantage that a web interface, i.e., a user interface based on at least one web page, can be provided to the user for monitoring, diagnosis, control, and configuration of the electrical equipment. Such a web interface can be operated intuitively by the user and allows for a clear display of the operating parameters and the available configuration options even if the number and complexity of the operating parameters and configuration options are great.

In addition, such a further development of the invention provides the advantage that access to such a web interface is possible from virtually any external computer device that has a web browser, without any special requirements for the hardware or software of the external computer device.

In another advantageous further development of the invention, it is provided that the communication module can be set up to store the parameter data and/or the display data in a standardized data format for web applications, in particular in JSON format and/or in an XML-based data format, in the memory of the communication module.

Such a further development of the invention offers the advantage that the parameter data and/or the display data can be read in and processed particularly easily by software provided for this purpose, e.g., by a web server software. The parameter data and/or the display data can be made available in the standardized data format for web applications, for example via a file system of the communication module, to a web server software of the communication module. On this basis, the web server can then generate the at least one web page that reproduces the operating parameters or a part thereof in a display corresponding to the display information.

In another advantageous further development of the invention, it is provided that the metadata record includes the access information in the form of operational parameter memory addresses, wherein each operational parameter memory address indicates the memory address of an operational parameter in the parameter memory.

In such a further development of the invention, the access information is thus formed as operating parameter memory addresses. The communication module can be set up to query the operating parameters by means of the operating parameter memory addresses. In particular, the communication module can be set up for read and/or write access to the operating parameters in the parameter memory by means of the operating parameter memory addresses.

Such further developments of the invention, in which the access information is formed as operating parameter memory addresses, offer the advantage that they allow for a particularly simple realization of the access to the operating parameters stored in the parameter memory, as is already supported by many electrical equipment and the protocols provided for communication with the electrical equipment. Particularly worth mentioning here are electrical equipment that offer a possibility of accessing the memory of the control electronics of the electrical equipment via a Modbus connection (first communication link) by means of the associated memory address.

In another advantageous further development of the invention, it is provided that the metadata record comprises a plurality of data fields each containing access information and/or display information, and the metadata record has a nested structure with a plurality of nesting levels, wherein each data field is associated with one of the nesting levels and the nested structure of the metadata record, as part of the display information, describes the structure of the display of the operating parameters within the user interface.

The nesting levels can be defined, e.g., by enclosing syntax elements, e.g., by bracketing with opening and closing brackets, especially with curly brackets, wherein an opening bracket defines the beginning and a closing bracket the end of a nesting level.

Such further developments of the invention offer the advantage that in this way a particularly compact data format of the metadata record can be realized, from which a very low storage space requirement in the memory of the control electronics of the electrical equipment results. In this way, it is possible to store the metadata record, and the access information and display information contained therein, in the memory of the control electronics even if the electrical equipment has only very simple and therefore inexpensive hardware. This is achieved by the fact that the structure of the display of the operating parameters, which forms part of the display information, is represented by the nested structure of the metadata record. Furthermore, the nested structure of the metadata record allows for easy reading of the display information and the access information, e.g., with the help of a parser.

In another advantageous further development of the invention, it is provided that the metadata record is stored in the form of a character string.

Such a further development of the invention offers the advantage that the metadata record can be provided in a particularly simple readable format, which is furthermore associated with a comparatively low storage space requirement.

In another advantageous further development of the invention, it is provided that the metadata record has a syntax that does not require control characters to indicate a character string within the metadata record and/or does not require quotation marks within the metadata record and/or does not require quotation marks to indicate a character string within the metadata record.

Such a further development of the invention offers the advantage that—in contrast to other common data formats—the metadata record can be largely free from redundancies. This means that the storage space required for storing the metadata record in the memory of the control electronics of the electrical equipment can be further reduced.

In another advantageous further development of the invention, it is provided that the computing power and/or memory capacity of the control electronics of the electrical equipment is limited in such a way that it does not permit operation of a web server by the control electronics and/or does not permit storage of the access information and/or the display information in a standardized data format for web applications, in particular in JSON format and/or in an XML-based data format, in the memory of the control electronics.

In another advantageous further development of the invention, it is provided that the control electronics operate at a clock frequency which is not greater than 250 MHz, in particular is not greater than 125 MHz, in particular is not greater than 100 MHz, in particular is not greater than 75 MHz, in particular is not greater than 50 MHz, and/or the control electronics have a main memory which is not larger than 512 kB, in particular not larger than 256 kB, in particular not larger than 128 kB, in particular not larger than 64 kB, in particular not larger than 32 kB, and/or the control electronics have a read-only memory which is not larger than 4096 kB, in particular is not larger than 2048 kB, in particular is not larger than 1024 kB, in particular is not larger than 512 kB, in particular is not larger than 256 kB.

The abbreviation kB denotes the unit of measurement kilobyte.

Such further developments of the invention, in which the computing power and/or the memory capacity of the control electronics of the electrical equipment are limited in this way, offer the advantage that very simple and therefore inexpensive hardware can be used for the electrical equipment. In particular, it is in principle possible in this way to use the hardware of conventional electrical equipment to implement an electronic device according to the invention. This is achieved by the fact that the necessary computing and memory resources do not have to be provided by the electrical equipment but can be provided by the communication module. The communication module can have more powerful hardware, which allows, e.g., for the operation of a web server. Thus, a convenient user interface, in particular a graphical user interface, for comprehensive and powerful monitoring, diagnosis, control and configuration of the electrical equipment can be provided by the communication module, while the electrical equipment is only equipped with simple and inexpensive hardware. All that is required is that the metadata record can be stored in the memory of the control electronics of the electrical equipment and be made accessible to the communication module. This can be realized in a simple manner, for example, by storing the metadata record at a predetermined memory address of the memory of the control electronics of the electrical equipment and by the communication module reading out the memory of the control electronics at this memory address in a manner known per se.

The electrical equipment is designed as an electrical energy supply device for the electrical energy supply of electrical components from an energy source. In addition, the electrical equipment includes all objects that, as a whole or in individual parts, are used for the use of electrical energy (e.g. objects for generating, forwarding, distributing, storing, measuring, converting and consuming) or the transmission, distribution and processing of information (e.g. telecommunications and information technology objects). Electrical equipment can also be equated with protective and auxiliary equipment, insofar as these are subject to electrical safety requirements. Further, electrical equipment can include any machine powered by electricity. It can include an enclosure, a variety of electrical components, and often a power switch. Examples of these include Lighting; Major appliances; Small appliances; IT equipment (computers, printers etc.); Motors, pumps, HVAC Systems, etc. Electrical equipment may refer to the individual components of an electrical distribution system. These components may include: Electric switchboards, Distribution boards, Circuit breakers, and disconnects, Transformers, Electricity meter, etc.

In another advantageous further development of the invention, it is provided that the electrical energy supply device is designed as a power supply unit, in particular as a power supply unit of an industrial control system and/or a programmable logic controller, and/or as a switched-mode power supply and/or as an uninterruptible power supply (UPS).

Such further developments of the invention offer the advantage that the previously explained advantages of the invention can be utilized to enable effective and convenient monitoring, diagnosis, control, and configuration of electrical energy supply devices in industrial electrical installations. This is particularly advantageous because modern electrical energy supply devices allow for the monitoring and configuration of a large number of operating parameters. The associated complexity can be addressed by the electronic device of the invention providing a powerful user interface. The present invention accomplishes this without requiring the electrical power equipment to be equipped with complex hardware.

In another advantageous further development of the invention, it is provided that the electrical equipment is designed as an electronic circuit breaker and/or as an overvoltage protection device.

In another advantageous further development of the invention, it is provided that the electrical equipment is designed as a measuring transducer and/or relay and/or switch and/or optocoupler and/or isolation amplifier and/or current measuring device and/or rectifier and/or inverter and/or converter and/or voltage converter.

In another advantageous further development of the invention, it is provided that the electrical equipment is designed as a field device of automation technology, in particular as a sensor and/or actuator of automation technology.

Such developments of the invention, in which the electrical equipment is designed in the manner mentioned, offer the advantage that the advantages of the invention explained above can also be made usable for such electrical equipment. This is particularly advantageous because nowadays these electrical equipment also usually offer a wide range of functions in the form of extensive monitoring and configuration options for a large number of operating parameters. Against this background, the present invention makes it possible to provide a powerful and convenient user interface for this electrical equipment without having to equip the electrical equipment with complex hardware.

In another advantageous further development of the invention, it is provided that the electrical equipment is set up so that it can also be operated in the industrial electrical installation without the communication module.

In such a further development of the invention, it is accordingly provided that the operating means, for example a switched-mode power supply (switching power source), can also be used autonomously, i.e., without the communication module, in its basic functionality, i.e., in the case of a switched-mode power supply it can be used to supply components of the industrial electrical installation with electrical energy from an energy source. The additional functionality of convenient remote monitoring, diagnosis, control, and parameterization provided by means of the communication module is optional and can be easily supplemented by adding a communication module and providing the metadata record in the memory of the control electronics of the electrical equipment. The basic functionality of the electrical equipment—as well as the optional communication with the communication module—can be controlled by the control electronics of the electrical equipment. This modular concept makes it possible to provide the user with customized solutions for the operation of electrical equipment in industrial electrical installations, while at the same time achieving significant cost advantages.

In another advantageous further development of the invention, it is provided that the operating parameters include: an identifier of the operating means indicating the type of electrical equipment, and/or a designation of the electrical equipment and/or an operating mode of the electrical equipment and/or an operating state of the electrical equipment and/or a voltage and/or current at an input and/or at an output of the electrical equipment, in particular an input voltage and/or output voltage and/or input current and/or output current, and/or a consumed electrical power and/or an output electrical power and/or a temperature of the electrical equipment and/or a position indication of the electrical equipment and/or an activation state and/or a type of password protection of the electrical equipment and/or a threshold value for a warning and/or threshold value for an emergency shutdown and/or a state of charge and/or a remaining capacity of the electrical equipment.

The operating parameters, in particular the identifier of the operating means, can also include information about a hardware and/or firmware and/or software version of the electrical equipment. The operating parameters can in particular also include information about errors that occurred during operation of the electrical equipment. This information may in particular include a time stamp. Accordingly, it is also possible for the operating parameters to comprise contents of an error memory. In particular, the operating parameters may also comprise a state of charge and/or a remaining capacity of the electrical equipment. This is particularly advantageous if the electrical equipment is designed as an uninterruptible power supply (UPS). The operating parameters can also comprise, for example, a threshold value related to the output current, in particular in the form of a warning threshold value and/or a switch-off threshold value in case of overload and/or a tripping threshold value for disconnecting a circuit.

Such further developments of the invention offer the advantage of allowing for particularly comprehensive monitoring, diagnosis, parameterization, and configuration of the electrical equipment.

In another advantageous further development of the invention, it is provided that the display information includes information about a structure of the display of the operating parameters, in particular an arrangement and/or sequence of the display of the operating parameters, and/or a formatting of the display of the operating parameters on at least one display page readable by a user, in particular on a web page.

The structure of the display can in particular specify an arrangement of the operating parameters to be displayed, for example a sequence and/or a grouping of the operating parameters to be displayed.

Such further developments of the invention offer the advantage that they permit a particularly clear and intuitively understandable display of the operating parameters for the user (operator).

In another advantageous further development of the invention, it is provided that the display information for a part of the operating parameters or for all operating parameters in each case includes information about an operating parameter identifier indicating the type of the respective operating parameter, and/or a data type of the respective operating parameter and/or a designation of the respective operating parameter and/or a unit of measurement of the respective operating parameter and/or a minimum and/or maximum numerical value of the respective operating parameter and/or a step size of a numerical value of the respective operating parameter and/or a numerical basis of a numerical value of the respective operating parameter and/or a maximum length of a text of the respective operating parameter.

The operating parameter identifier can take the form of an ID, for example. The operating parameter identifier can, for example, take the form of a number or a letter-number combination. The operating parameter identifier can be used to uniquely identify the respective operating parameter and its type.

The data type of the respective operating parameter can be, for example, one of the following: string, number, IP address, date, time, password, text, selection field (for example, in the form of one or more checkboxes or in the form of radio buttons), list, composite data type.

The designation of the respective operating parameter, i.e., the operating parameter designation, can be in the form of a label that can be read by a user. The designation of the respective operating parameter can expediently be designed in particular as a descriptive term that is understandable for a user.

Information on the minimum and/or maximum numerical value, the step size of the numerical value, and the maximum length of a text of the respective operating parameter can be used to provide the user with information on the framework conditions under which the respective operating parameter can be configured, so that misconfigurations can be proactively avoided.

Such further developments of the invention offer the advantage of enabling comprehensive and unambiguous information on the operating parameters of the electrical equipment to be provided to the user via the user interface.

In another advantageous further development of the invention, it is provided that the communication module is replaceable. For example, the communication module can be snapped onto the electrical equipment.

Such further developments of the invention, in which the communication module is replaceable, offer the advantage that a modular concept can be realized in which electrical equipment can be retrofitted with the communication module and the functionality provided by it. In addition, it is possible in this way to easily exchange and replace communication modules and to use one and the same communication module successively for different electrical equipment. This not only allows for the communication module to be used in a considerably more flexible manner, but also allows for considerable cost advantages to be achieved. The communication module can, for example, be offered as an accessory for the respective electrical equipment. In this context, the communication module can be set up to be used with different electrical equipment of different types and/or of different kinds. For example, the communication module can be set up to be used both in conjunction with a switched-mode power supply and in conjunction with an electronic circuit breaker or a measuring transducer.

In another advantageous further development of the invention, it is provided that the communication module is arranged to be detachably connected to the electrical equipment for establishing the first communication link.

Such a further development of the invention offers the advantage that the communication module can be replaced in a simple manner to achieve the advantages of the modular concept explained above.

In another advantageous further development of the invention, it is provided that the communication module can be plugged onto a housing of the electrical equipment from the outside by means of an electrical plug connection.

Such a further development of the invention also offers the advantage that the communication module can be designed to be replaceable in a simple manner, so that the advantages of the modular concept explained above can be realized.

The above-mentioned object is further achieved by a communication module of an electronic device for an industrial electrical installation having the features of claim 25.

Accordingly, it is provided that a communication module of the aforementioned type is designed in such a way that the communication module is set up to receive, via the first communication link, a metadata record which is stored in the memory of the control electronics of the electrical equipment and contains access information and display information, wherein the access information enables the communication module to access the individual operating parameters stored in the parameter memory, and the display information describes the intended display of the individual operating parameters stored in the parameter memory within a user interface, and is arranged to read out the access information and the display information from the metadata record, and is set up to query a number of operating parameters from the parameter memory of the control electronics by means of the access information via the first communication link and to store the queried operating parameters in the form of parameter data in the memory of the communication module, and is arranged to store the display information in the form of display data in the memory of the communication module.

In particular, the communication module according to the invention may be of the type previously described, as explained in connection with the electronic device according to the invention. Likewise, the electrical equipment and/or the external computer device may be of the type previously described, as previously explained in connection with the electronic device according to the invention.

The advantages explained in connection with the electronic device according to the invention can also be achieved by such a communication module, so that reference can be made in this respect to the corresponding explanations concerning the electronic device according to the invention.

The above-mentioned object is further achieved by a method for operating an electronic device for an industrial electrical installation having the features of claim 26.

Accordingly, it is proposed that in a method of the type mentioned above, the communication module performs the following steps: receiving a metadata record, which is stored in the memory of the control electronics of the electrical equipment and contains access information and display information via the first communication link, wherein the access information enables the communication module to access the individual operating parameters stored in the parameter memory and the display information describes the intended display of the individual operating parameters stored in the parameter memory within a user interface; reading out the access information and the display information from the metadata record; querying a number of operating parameters from the parameter memory of the control electronics by means of the access information via the first communication link and store the queried operating parameters in the form of parameter data in the memory of the communication module; and/or storing the display information in the form of display data in the memory of the communication module.

The electrical equipment and/or the communication module and/or the electronic device and/or the external computer device can be designed in particular in the manner described above, as explained in connection with the electronic device according to the invention.

The advantages explained in connection with the electronic device according to the invention can also be achieved by such a method according to the invention, so that reference can be made to the corresponding explanations.

In an advantageous further development of the method according to the invention, it is provided that the communication module transmits the queried operating parameters or a part thereof in a display corresponding to the display information to the external computer device via the second communication link, using the parameter data and the display data.

In another advantageous further development of the method according to the invention, it is provided that the communication module generates the user interface, using the parameter data and the display data, wherein the operating parameters are displayed within the user interface in accordance with the display information.

In another advantageous further development of the method according to the invention, it is provided that the communication module receives and evaluates a configuration command transmitted via the second communication link from the external computer device for configuring at least one configurable operating parameter and, by means of the access information via the first communication link, accesses the parameter memory of the control electronics of the electrical equipment in a writing manner and configures the configurable operating parameter in accordance with the configuration command.

In another advantageous further development of the method according to the invention, it is provided that the user interface is designed as at least one web page and the communication module has a web server which is set up for data communication with the external computer device via the second communication link. It is provided that the communication module stores the parameter data and the display data in a format readable by the web server in the memory of the communication module. It is further provided that the web server reads in the parameter data and the display data and, by means of the parameter data and the display data, generates the at least one web page which reproduces the operating parameters or a part thereof in a display corresponding to the display information. Furthermore, in such a further development of the method according to the invention, it is provided that the web server transmits the at least one web page to the external computer device.

In another advantageous further development of the method according to the invention, it is provided that the communication module stores the parameter data and/or the display data in a standardized data format for web applications in the memory of the communication module. This can in particular be the JSON format and/or an XML-based data format.

In another advantageous further development of the method according to the invention, it is provided that the communication module is detachably connected to the electrical equipment for establishing the first communication link.

In another advantageous further development of the method according to the invention, it is provided that the communication module is plugged into a housing of the electrical equipment from the outside by means of an electrical plug connection.

The components involved in the method according to the invention can be designed in the manner explained above. In this respect, reference can therefore be made to the explanations concerning the electronic device according to the invention and the communication module according to the invention.

The aforementioned object is further achieved by a computer program with program code means, which is set up for carrying out a method of the aforementioned type when the computer program is executed on a computer.

The computer may, for example, be the computer of a communication module or comprise such a computer.

The advantages explained above can also be achieved by such a computer program, so that reference can be made to the corresponding explanations.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
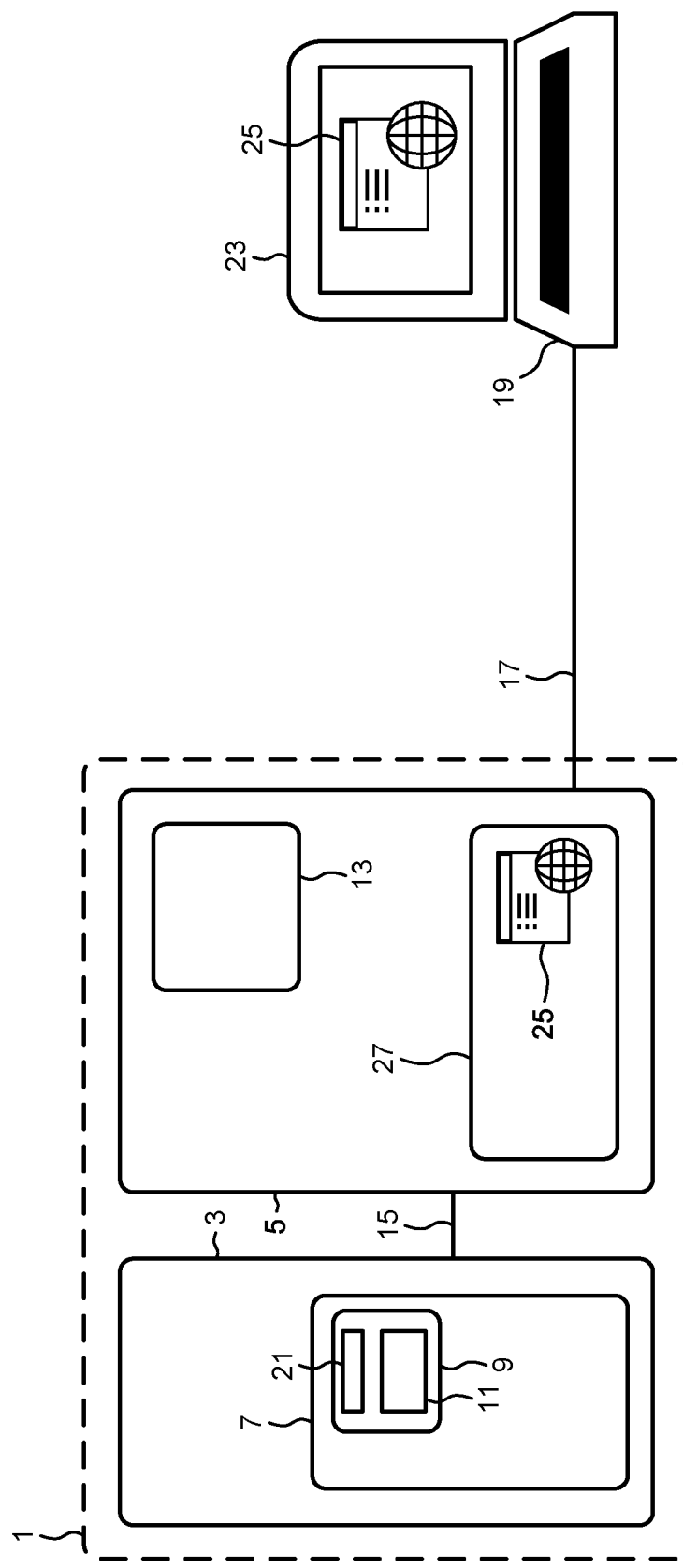
FIG. 1 is a schematic representation of an electronic device according to the invention and an external computer device.

FIG. 1 shows a schematic representation of an exemplary embodiment of an electronic device 1 according to the invention for an industrial electrical installation. It can be seen that the electronic device 1 comprises an electrical equipment 3, which in this exemplary embodiment is designed as an electrical energy supply device for the electrical energy supply of electrical components from an energy source, namely as a power supply unit of an industrial controller. The electrical equipment 3 configured as a power supply unit has control electronics 7, which in this exemplary embodiment are configured as a microcontroller and has a memory 9.

It can also be seen in FIG. 1 that the memory 9 of the control electronics 7 comprises a parameter memory 11. Operating parameters of the power supply unit are stored in this parameter memory 11.

In the exemplary embodiment, the operating parameters include, for example, an identifier indicating the type of electrical equipment (power supply, type of power supply), a designation, an operating mode and an operating state of the electrical equipment, an input voltage and an output voltage, a consumed electrical power and an output electrical power, a threshold value for a warning and a threshold value for an emergency shutdown of the electrical equipment, and a temperature and a position indication of the electrical equipment.

The computing power and the storage capacity of the control electronics 7 of the electrical equipment 3, i.e., the computing power and the storage capacity of the microcontroller of the power supply unit, are limited in the exemplary embodiment of FIG. 1 in such a way that they do not permit operation of a web server by the control electronics 7. Likewise, the computing power and the storage capacity of the microcontroller of the power supply unit are limited in such a way that they do not allow the access information and the display information to be stored in JSON format or in an XML-based data format or in any other standardized data format for web applications in the memory 9 of the control electronics 7. In this exemplary embodiment, the control electronics 7, i.e., the microcontroller, operates at a clock frequency of 48 MHz and has a main memory with a size of 32 kB and a read-only memory with a size of 256 kB.

Furthermore, it can be seen in FIG. 1 that the electronic device 1 has, in addition to the electrical equipment 3, a communication module 5 comprising a memory 13. The communication module 5 is set up for data communication with the control electronics 7 of the electrical equipment 3, which are in the form of a microcontroller, via a first communication link 15. In this exemplary embodiment, the first communication link 15 is designed as a Modbus/RTU link. The communication module 5 is set up for data communication with an external computer device 19 via a second communication link 17, which in the embodiment of FIG. 1 is designed as an Ethernet link in accordance with the IEEE 802.3 standard.

FIG. 1 also shows schematically that a metadata record 21 is stored in the memory 9 of the control electronics 7 of the electrical equipment 3. The metadata record 21 contains access information and display information. The access information allows for the communication module 5 to access the individual operating parameters of the power supply unit stored in the parameter memory 11. The display information describes the intended display of the individual operating parameters of the power supply unit stored in the parameter memory 11 within a user interface 25.

In the exemplary embodiment of FIG. 1, the metadata record 21 is stored in the form of a character string, i.e., stored in the form of a string, and has a syntax that does not require control characters to indicate a character string within the metadata record 21 and, in particular, does not require quotation marks within the metadata record 21 to indicate a character string or for other purposes.

In the exemplary embodiment of FIG. 1, the metadata record 21 contains the access information in the form of operating parameter memory addresses, i.e., the access information is formed as operating parameter memory addresses. Each operating parameter memory address indicates the memory address of an operating parameter in the parameter memory 11, i.e., the address at which the respective operating parameter is stored in the parameter memory 11.

The metadata record 21 of the exemplary embodiment of FIG. 1 comprises a plurality of data fields, each containing access information and/or display information, and has a nested structure with a plurality of nesting levels. The nesting levels are defined by enclosing syntax elements in the form of opening and closing curly brackets, wherein an opening bracket indicates the beginning, and a closing bracket indicates the end of a nesting level. Each data field of the metadata record is assigned to one of the nesting levels. The nested structure of the metadata record thus describes the intended structure of the display of the operating parameters within the user interface 25 as part of the display information.

An example of such a nested structure is shown below as pseudo code:

```
PageName1{
  SectionName{
    FormName{
      ObjectAddress{ObjectContent}
      ObjectAddress{ObjectContent}
      ObjectAddress{ObjectContent}
    }
    FormName{
      ...
    }
```

-continued

```
  }
}
PageName2{
  SectionName{
    ...
  }
  SectionName{
    ...
  }
}
PageName3{
  ...
}
```

The tabs are shown here only for clarity; in fact, the metadata record, which is formed as a string, is stored, and transmitted without the tabs in the exemplary embodiment. All "sections" in a "page" level are displayed on a single web page, all "forms" in a "section" level are displayed within a section and all objects in a "form" level are displayed within a form. The classification in the respective level is defined by the opening and closing curly brackets. Each object can comprise one or more operating parameters. An object address (operating parameter memory address) and the associated object content are specified for each object.

The communication module 5 shown in FIG. 1 is set up to receive the metadata record 21 via the Modbus/RTU connection, i.e., via the first communication link 15, and to read out the access information and the display information from the metadata record 21. Furthermore, the communication module 5 is set up to use the access information, i.e., the operating parameter memory addresses, to query all operating parameters of the electrical equipment 3, i.e., of the power supply unit, from the parameter memory 11 of the control electronics 7 of the electrical equipment 3 via the first communication link 15 and to store the queried operating parameters in the form of parameter data in the memory 13 of the communication module 5. In particular, the communication module 5 is set up to cyclically query several operating parameters, namely those operating parameters of the power supply unit which can change over time (e.g., input and output voltage, consumed and output electrical power and temperature of the power supply unit) in the manner mentioned and to store at least the current value of the respective operating parameter in the memory 13.

Furthermore, in the exemplary embodiment of FIG. 1, the communication module 5 is set up to store the display information, which is read out from the metadata record 21 in the form of display data, in the memory 13 of the communication module 5.

FIG. 1 further reveals that the communication module 5 includes a web server 27 arranged for data communication with the external computer device 19 via the second communication link 17, i.e., via the Ethernet link. The communication module 5 is arranged to generate, by means of the web server 27 and using the parameter data and display data stored in the memory 13, a user interface 25 formed as a website comprising a plurality of web pages. The operating parameters are displayed within the website in accordance with the display information.

In the exemplary embodiment of FIG. 1, the communication module 5 is set up to store the parameter data and the display data in a standardized data format for web applications, namely in JSON format, in the memory 13 of the communication module 5. In this way, the parameter data and the display data can be stored in the memory 13 of the communication module 5 in a format that can be read by the web server 27.

The web server 27 shown in FIG. 1 is arranged to read in the parameter data and display data stored in the memory 13 in JSON format and to generate, by means of the parameter data and the display data, the website whose web pages reproduce the operating parameters of the power supply unit, i.e., of the electrical equipment 3, in a display corresponding to the display information. Further, the web server 27 is adapted to transmit the web pages of the website to the external computer device 19 via the second communication link 17, that is, via the Ethernet link.

In the embodiment of FIG. 1, the external computer device 19 is a conventional personal computer and includes a web browser. By means of the web browser of the external computer device 19, a user can retrieve the web pages of the user interface 25 generated by the web server 27 via the second communication link 17. The web pages of the user interface 25 are displayed to the user on a display 23 of the external computer device 19. In this manner, the user is provided with a convenient and powerful user interface that allows the user to monitor, diagnose, control, and configure the power supply unit (electrical equipment 3) easily and comprehensively.

For this purpose, in the exemplary embodiment shown in FIG. 1, the user can transmit configuration commands for configuring configurable operating parameters of the electrical equipment 3 to the external computer device 19 via the user interface 25. The communication module 5 is arranged to receive and evaluate the configuration commands for configuring the configurable operating parameters received from the external computer device 19 via the second communication link 17. Furthermore, the communication module 5 is arranged to write-access the parameter memory 11 of the control electronics 7 of the electrical equipment 3 by means of the access information, i.e., by means of the operating parameter memory addresses, via the Modbus/RTU connection, i.e., via the first communication link 15, and to configure the configurable operating parameters in accordance with the configuration commands. Such configurable operating parameters can be, for example, a threshold value for a warning or a threshold value for an emergency shutdown of the power supply unit or an operating mode of the power supply unit.

In the exemplary embodiment shown in FIG. 1, the communication module 5 is replaceable and can be detachably connected to the electrical equipment 3 to establish the first communication link 15, namely by means of an electrical plug connection from the outside to a housing of the electrical equipment.

Figure 2:
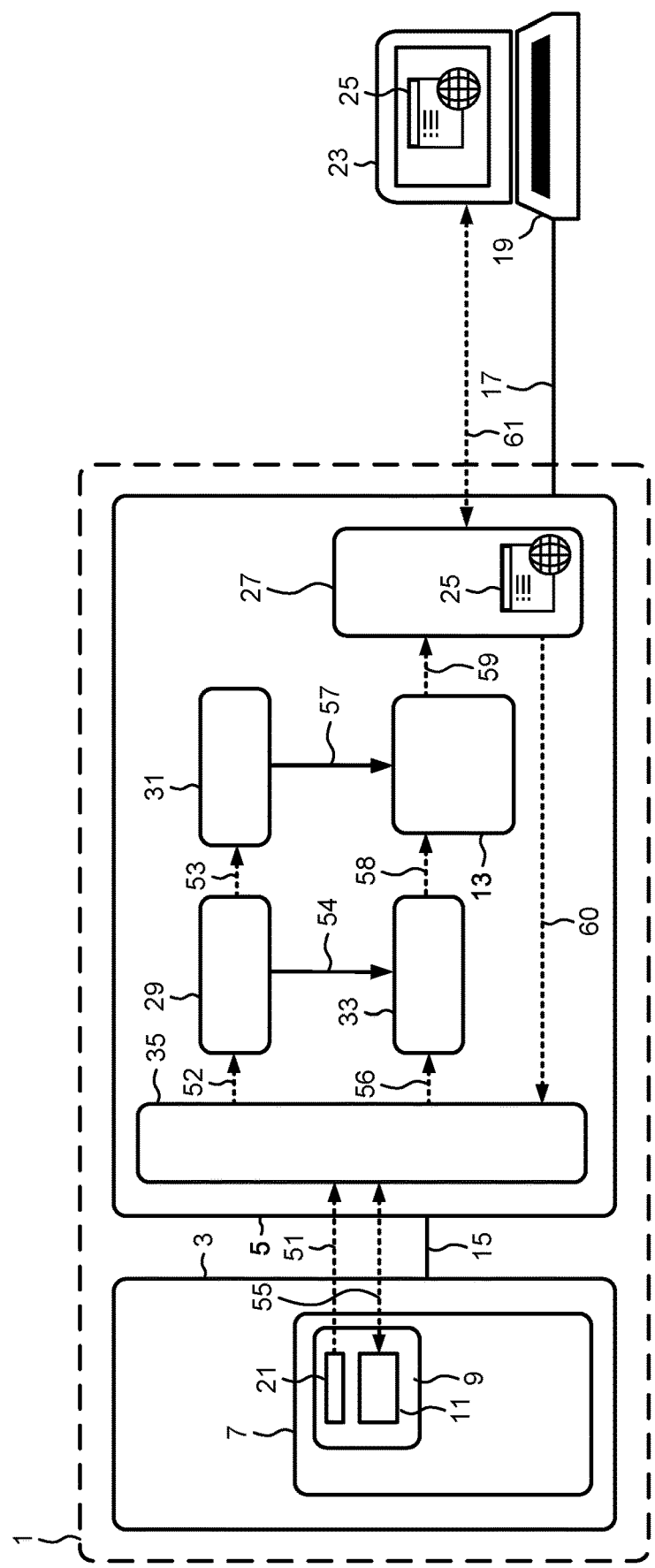
FIG. 2 is a more detailed schematic representation of an electronic device according to the invention and an external computer device.

FIG. 2 shows a more detailed schematic representation of an exemplary embodiment of an electronic device 1 according to the invention, again displaying the electrical equipment 3 and the communication module 5, wherein FIG. 2 also shows an exemplary structure of the communication module 5 and the interaction of its components.

The manner in which the electrical equipment 3 and the communication module 5 exchange data, in particular exchange operating parameters and associated access information and display information, is referred to in the following by way of example as a "Simple Interface Layout Protocol (SILP)". The metadata record 21 stored in the form of a character string is referred to below by way of example as an "SILP string".

In the exemplary embodiment of FIG. 2, the communication module 5—in addition to the components already shown in FIG. 1 and explained above—has an SILP handler 29, an SILP layout handler 31, an SILP value handler 33 and a Modbus handler 35. These components can be implemented in software, in hardware or as a combination of software and hardware. In particular, it is also conceivable that these components or parts thereof are implemented in firmware of the communication module 5.

In accordance with the exemplary embodiment shown in FIG. 1, the electrical equipment 3 in the embodiment shown in FIG. 2 also has control electronics 7 with a memory 9 comprising a parameter memory 11 in which the operating parameters of the electrical equipment are stored. The SILP string (metadata record) is also stored in the memory 9 of the electrical equipment. The SILP string contains the operating parameter memory addresses for all operating parameters of the electrical equipment 3 as access information, with the aid of which the communication module 5 can access the operating parameters stored in the parameter memory 11. In addition, the SILP string 21 contains the display information which describes the intended display of the individual operating parameters stored in the parameter memory 11 within the user interface 25. For the rest, reference can be made in this respect to the explanations of the exemplary embodiment of FIG. 1.

FIG. 2 also shows schematically that the Modbus handler 35 of the communication module 5 is set up for data communication with the control electronics 7 of the electrical equipment 3 via the first communication link 15, which in this embodiment is designed as a Modbus connection, namely as a Modbus/RTU connection. Via this Modbus connection 15, the Modbus handler 35 can have read and write access to the memory 9 of the electrical equipment 3. In particular, the Modbus handler 35 can read out the SILP string stored in the memory 9, i.e., the metadata record 21, via a communication relationship 51.

Furthermore, it can be seen in FIG. 2 that the Modbus handler 35 is set up to forward the read-out SILP string to the SILP handler 29 via a communication relationship 52. The SILP handler receives the SILP string and reads out the access information and the display information from it. The read-out display information is passed from the SILP handler 29 to the SILP layout handler 31 via a communication relationship 53, and the read-out access information, i.e., the operating parameter memory addresses, is passed from the SILP handler 29 to the SILP value handler 33 via a communication relationship 54.

The SILP value handler is set up to query the operating parameters from the parameter memory 11 of the control electronics 7 of the electrical equipment 3 with the aid of the Modbus handler 35 by means of the access information in the form of the operating parameter memory addresses. The query of the operating parameters, which change over time, is carried out cyclically in this case, so that current values of the respective operating parameters can always be displayed within the user interface 25. For this purpose, the Modbus handler 35 receives the respective current operating parameters stored in the parameter memory 11 via a communication relationship 55. The communication takes place in the manner explained above via the Modbus connection, i.e., via the first communication link 15. The Modbus handler 35 passes on the received operating parameters to the SILP value handler 33 via a communication relationship 56. The SILP value handler 33 is arranged to store the queried operating parameters in the form of parameter data in the memory 13 of the communication module 5 via a communication relationship 58. In this exemplary embodiment, the queried operating parameters are stored in JSON format in the file system of the communication module 5.

Furthermore, it can be seen from FIG. 2 that the SILP layout handler 31 is arranged to store the display information received from the SILP handler 29 in the form of display information in the memory 13 of the communication module 5 via a communication relationship 57. In this exemplary embodiment, the display information is thereby also stored in JSON format in the file system of the communication module 5. The contents of these files are instructions on how the corresponding operating parameter is to be displayed within the user interface 25.

Also shown in FIG. 2 is that the web server 27 of the communication module 5 can access the parameter data and display data stored in the memory 13 via a communication relationship 59. For example, the parameter data and display data stored in JSON format may be provided to the web server 27 via the file system of the communication module 5. The web server 27 can read the parameter data and the display data in this manner and generate, by means of the parameter data and the display data, a website comprising one or more web pages, wherein the web pages reproduce the operating parameters in a display corresponding to the display information. The website is shown in FIG. 2 as a user interface 25.

It can also be seen in FIG. 2 that the external computer device 19 is set up to communicate with the web server 27 of the communication module 5 via a communication relationship 61. The communication takes place via the second communication link 17, which in this embodiment is designed as an Ethernet connection. In this way, the web server 27 can transmit the web pages of the user interface 25 to a browser of the external computer device 19 so that the external computer device 19 can display the web pages of the user interface 25 on the display 23 by means of the browser.

Further, in the embodiment of FIG. 2, the external computer device 19 is set up to transmit configuration commands to the web server 27 via the communication relationship 61. In this regard, a user may generate the configuration commands by means of the browser of the external computer device 19 by making entries within a web page of the user interface 25. In this manner, it is possible, for example, for the user to generate configuration commands for configuring certain configurable operational parameters and for these configuration commands to be transmitted to the web server 27 via the communication relationship 61. The web server 27 is configured to receive and evaluate the configuration commands for configuring configurable operating parameters from the external computer device 19 via the communication relationship 61, i.e., via the second communication link 17.

Via a communication relationship 60, the web server 27 in the exemplary embodiment of FIG. 2 can address the Modbus handler 35. Based on the commands received from the web server 27 via the communication relationship 60, the Modbus handler 35 is set up to write-access the parameter memory 11 of the control electronics 7 of the electrical equipment 3 via the communication relationship 55, i.e., via the Modbus connection 15, by means of the access information, i.e., by means of the operating parameter memory addresses, and to configure the configurable operating parameters in accordance with the configuration commands.

In this way, a powerful and convenient user interface is provided to the user at the external computer device 19, by means of which the user can read and write access the operating parameters of the electrical equipment 3 in order to monitor and configure the electrical equipment 3 without the need for the electrical equipment 3 to have sophisticated hardware or software.

This is particularly advantageous when multiple electronic devices 1 according to the invention are connected to a single external computer device 19, so that multiple electrical devices 3 can be monitored and configured via a single external computer device 19 and a single user interface 25.

Figure 3:
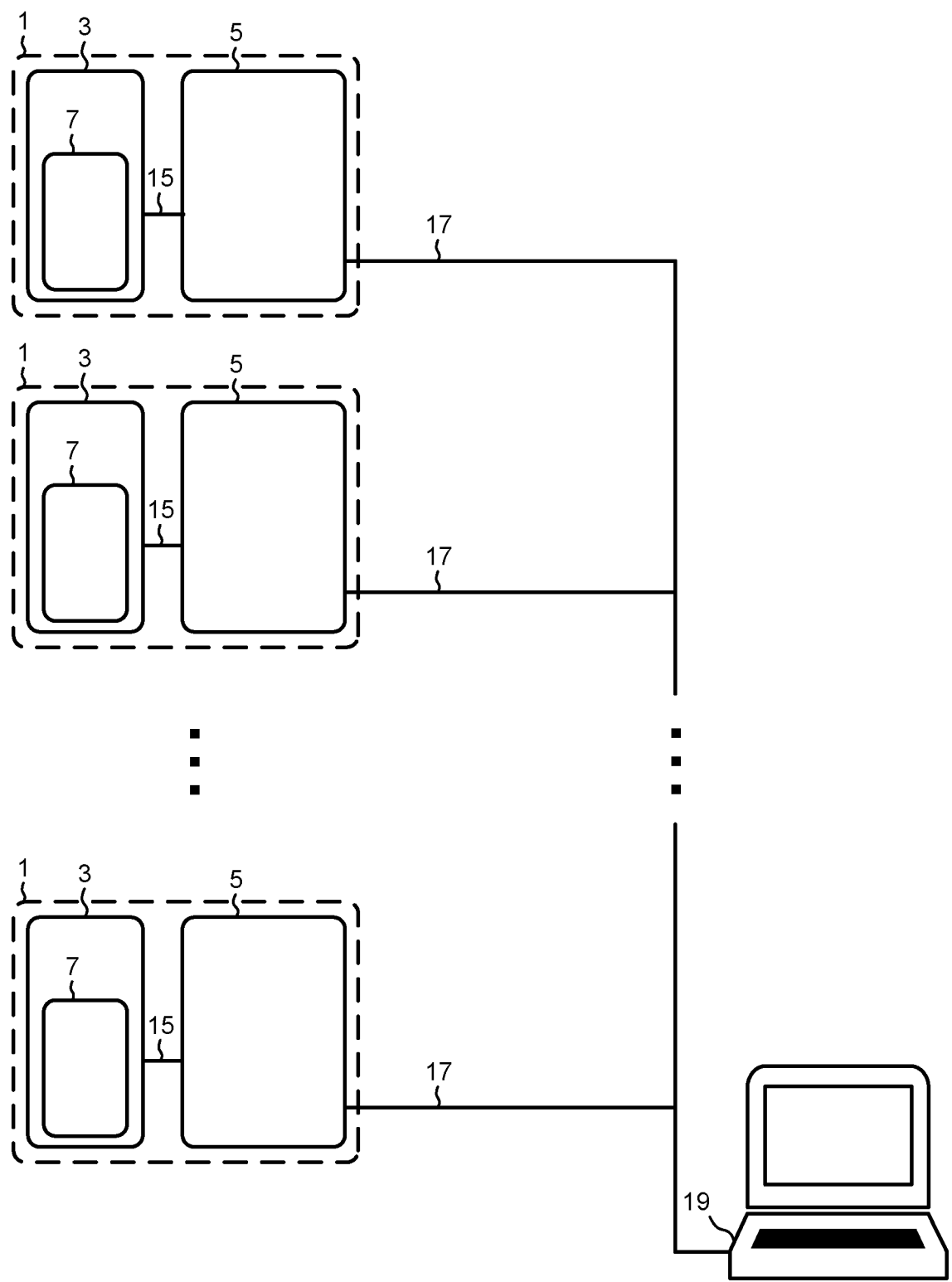
FIG. 3 is a plurality of computer devices according to the invention connected to an external computer device.

Such a configuration is shown in the exemplary embodiment of FIG. 3. It can be seen that several electronic devices 1 of the type explained above are connected to the external computer device 19 via second communication links 17. In this exemplary embodiment, the second communication links 17 are again designed as Ethernet connections. The second communication links 17 are thereby part of a computer network, namely an Ethernet computer network according to the IEEE 802.3 standard. IP packets can thereby be exchanged between the communication modules 5 of the respective electronic device 1 and the external computer device 19 via the second communication links 17. For the rest, reference can be made to the explanations of FIGS. 1 and 2 with regard to the exemplary embodiment of FIG. 3.

Figure 4:
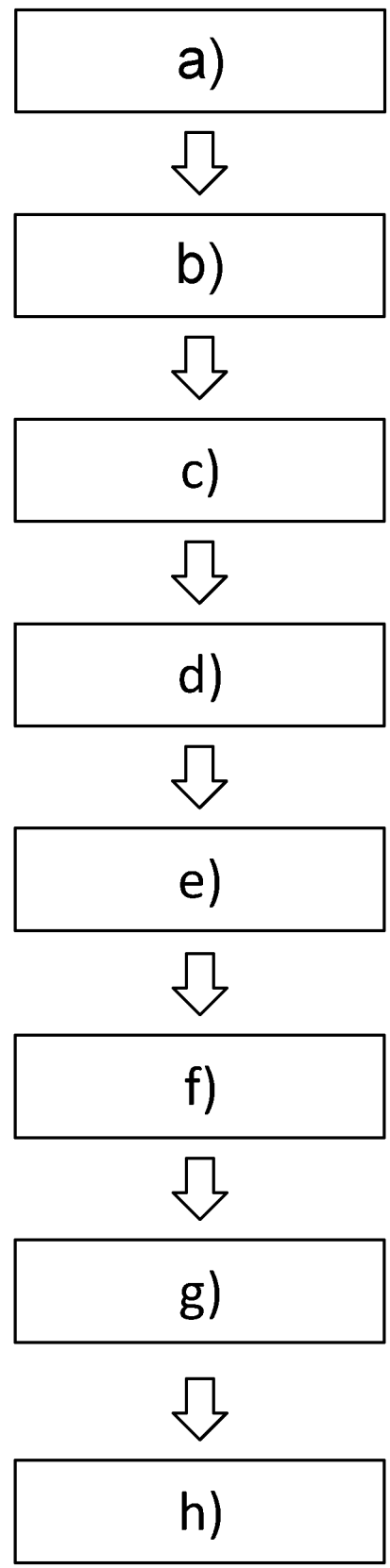
FIG. 4 is an exemplary process of a method according to the invention.

FIG. 4 schematically shows an exemplary sequence of a method according to the invention for operating an electronic device 1 of the type explained above for an industrial electrical installation.

In step a), the communication module 5 receives the metadata record 21, which is stored in the memory 9 of the control electronics 7 of the electrical equipment 3 and contains access information and display information, via the first communication link 15. In accordance with the previous embodiments, the access information thereby enables the communication module 3 to access the individual operating parameters stored in the parameter memory and the display information describes the intended display of the individual operating parameters stored in the parameter memory 11 within the user interface 25.

In step b), the communication module reads out the access information and the display information from the received metadata record.

In step c) of the exemplary embodiment of FIG. 4, the communication module queries a number of operating parameters from the parameter memory 11 of the control electronics 7 via the first communication link 15 by means of the access information. Furthermore, in step c), the communication module stores the queried operating parameters in the form of parameter data in the memory 13 of the communication module 5.

In step d), the communication module stores the display information read out from the metadata record in the form of display data in the memory 13 of the communication module 5.

In the exemplary embodiment of FIG. 4, the parameter data and the display data are stored in the memory 13 of the communication module 5 in a format readable by the web server 27, namely in JSON format.

In step e) of the exemplary embodiment of the method according to the invention shown in FIG. 4, the web server reads in the parameter data and the display data and, by means of the parameter data and the display data, generates at least one web page as a user interface which reproduces the operating parameters or at least a part thereof in a display corresponding to the display information. In this way, the web server of the communication module 5 generates the user interface 25 using the parameter data and the display data, within which user interface the operating parameters are represented in accordance with the display information.

In step f) of the method, the web server transmits the at least one web page to the external computer device 19.

In step g), the communication module 5, namely the web server 27 of the communication module 5, receives and evaluates a configuration command transmitted via the communication link 17 from the external computer device 19 for configuring at least one configurable operational parameter.

In step h) of the exemplary embodiment shown in FIG. 4, the communication module 5 finally write-accesses the parameter memory 11 of the control electronics 7 of the electrical equipment 3 by means of the access information via the first communication link 15 and configures the configurable operating parameter in accordance with the configuration command.

In the context of the present application, the undefined term "a" is principally not to be understood as a number word. The term "a" used in the context of this application does not exclude a plural unless explicitly indicated (e.g., by the wording "exactly one"). Thus, if, for example, a component or a parameter is mentioned, this is to be understood in the sense of "at least one component" or "at least one parameter".

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electronic device for an industrial electrical installation, comprising:
   at least one electrical equipment comprising control electronics with a memory and the memory of the control electronics comprises a parameter memory in which operating parameters of the electrical equipment are stored; and
   a communication module having a memory and being set up for a communication relationship for data communication with the control electronics of the electrical equipment via a first communication link and for data communication with an external computer device via a second communication link,
   wherein the memory of the control electronics of the electrical equipment stores a metadata record which contains access information and display information,
   wherein the access information enables the communication module to access the individual operating parameters stored in the parameter memory and the display information describes an intended display of the individual operating parameters stored in the parameter memory within a user interface, and
   wherein the communication module is arranged to read the metadata record stored in the memory of the control electronics of the electrical equipment via the communication relationship between the communication module and the control electronics of the electrical equipment and to receive the metadata record via the first communication link and to read the access information and the display information from the metadata record,
   wherein the communication module is set up to query a number of the operating parameters from the parameter memory of the control electronics via the access information via the first communication link and to store the queried operating parameters in the form of parameter data in the memory of the communication module, and
   wherein the communication module is arranged to store the display information in the form of display data in the memory of the communication module.

2. The electronic device according to claim 1, wherein the communication module is arranged to transmit the queried operating parameters or a part thereof in a display corresponding to the display information to the external computer device via the second communication link using the parameter data and the display data.

3. The electronic device according to claim 1, wherein the communication module is arranged to generate the user interface using the parameter data and the display data, and wherein the queried operating parameters or a part thereof are displayed within the user interface in accordance with the display information.

4. The electronic device according to claim 1, wherein the communication module is arranged to receive and evaluate a configuration command transmitted via the second communication link from the external computer device for configuring at least one configurable operating parameter, and to write-access the parameter memory of the control electronics of the electrical equipment via the access information via the first communication link and configure the configurable operating parameter in accordance with the configuration command.

5. The electronic device according to claim 1, wherein the user interface is designed as at least one web page, wherein the communication module comprises a web server adapted for data communication with the external computer device via the second communication link, wherein the communication module is arranged to store the parameter data and the display data in a format readable by the web server in the memory of the communication module, wherein the web server is set up to read in the parameter data and the display data and, via the parameter data and the display data, to generate the at least one web page which reproduces the operating parameters or a part thereof in a display corresponding to the display information, and wherein the web server is arranged to transmit the at least one web page to the external computer device.

6. The electronic device according to claim 1, wherein the communication module is set up to store the parameter data and/or the display data in a standardized data format for web applications in JSON format and/or in an XML-based data format in the memory of the communication module.

7. The electronic device according to claim 1, wherein the metadata record contains the access information in the form of operating parameter memory addresses, and wherein each operating parameter memory address indicates the memory address of an operating parameter in the parameter memory.

8. The electronic device according to claim 1, wherein the metadata record comprises a plurality of data fields each containing access information and/or display information, and the metadata record has a nested structure with a plurality of nesting levels, wherein each data field is assigned to one of the nesting levels, and the nested structure of the metadata record, as part of the display information, describes the structure of the display of the operating parameters within the user interface.

9. The electronic device according to claim 1, wherein the metadata record is stored in the form of a character string.

10. The electronic device according to claim 1, wherein the metadata record has a syntax that does not require control characters to indicate a character string within the metadata record and/or does not require quotation marks within the metadata record and/or does not require quotation marks to indicate a character string within the metadata record.

11. The electronic device according to claim 1, wherein the computing power and/or storage capacity of the control electronics of the electrical equipment is limited in such a way that the computing power and/or storage capacity:
  does not permit operation of a web server by the control electronics; and/or
  does not permit storage of the access information and/or the display information in a standardized data format for web applications in the memory of the control electronics.

12. The electronic device according to claim 1, wherein the control electronics operate at a clock frequency which is not greater than 250 MHz and/or wherein the control electronics have a main memory which is not larger than 512 kB and/or wherein the control electronics have a read-only memory which is not larger than 4096 kB.

13. The electronic device according to claim 1, wherein the electrical equipment is designed as an electrical energy supply device for the electrical energy supply of electrical components from an energy source.

14. The electronic device according to claim 13, wherein the electrical energy supply device is designed as a power supply unit and/or as a power supply unit of an industrial controller and/or of a programmable logic controller, and/or as a switched-mode power supply unit and/or as an uninterruptible power supply (UPS).

15. The electronic device according to claim 1, wherein the electrical equipment is designed as an electronic circuit breaker and/or as an overvoltage protection device.

16. The electronic device according to claim 1, wherein the electrical equipment is designed as a measuring transducer and/or relay and/or switch and/or optocoupler and/or isolation amplifier and/or current measuring device and/or rectifier and/or inverter and/or voltage converter.

17. The electronic device according to claim 1, wherein the electrical equipment is designed as a field device of automation technology.

18. The electronic device according to claim 1, wherein the electrical equipment is adapted to be set up to be operated in the industrial electrical installation without the communication module.

19. The electronic device according to claim 1, wherein the operating parameters include:
  an identifier of the operating means indicating the type of electrical equipment; and/or
  a designation of the electrical equipment; and/or
  an operating mode of the electrical equipment; and/or
  an operating state of the electrical equipment; and/or
  a voltage and/or current at an input and/or at an output of the electrical equipment, in particular an input voltage and/or output voltage and/or input current and/or output current; and/or
  a consumed electrical power and/or an output electrical power; and/or
  a temperature of the electrical equipment; and/or
  a position indication of the electrical equipment; and/or
  an activation state and/or a type of password protection of the electrical equipment; and/or
  a threshold value for a warning and/or a threshold value for an emergency shutdown; and/or
  a state of charge and/or a remaining capacity of the electrical equipment.

20. The electronic device according to claim 1, wherein the display information comprises information on a structure of the display of the operating parameters, in particular an arrangement and/or sequence of the display of the operating parameters, and/or a formatting of the display of the operating parameters on at least one display page readable by a user, in particular on a web page.

21. The electronic device according to claim 1, wherein the display information for part of the operating parameters or for all of the operating parameters in each case comprises information about:
  an operating parameter identifier indicating the type of the respective operating parameter; and/or
  a data type of the respective operating parameter; and/or
  a designation of the respective operating parameter; and/or
  a unit of measurement of the respective operating parameter; and/or
  a minimum and/or maximum numerical value of the respective operating parameter; and/or
  a step size of a numerical value of the respective operating parameter; and/or
  a numerical basis of a numerical value of the respective operating parameter; and/or
  a maximum length of a text of the respective operating parameter.

22. The electronic device according to claim 1, wherein the communication module is replaceable.

23. The electronic device according to claim 1, wherein the communication module is arranged to be detachably connected to the electrical equipment to establish the first communication link.

24. The electronic device according to claim 1, wherein the communication module is adapted to be plugged from the outside onto a housing of the electrical equipment via an electrical plug connection.

25. A communication module of an electronic device for an industrial electrical installation, which is set up for a communication relationship for data communication via a first communication link with control electronics of an electrical equipment, wherein the control electronics of the electrical equipment has a memory and the memory of the control electronics comprises a parameter memory in which operating parameters of the electrical equipment are stored, and which is set up for data communication via a second communication link with an external computer device,
  wherein the communication module is set up to read a metadata record stored in the memory of the control electronics of the electrical equipment via the communication relationship between the communication module and the control electronics of the electrical equipment and to receive, via the first communication link, the metadata record, wherein the metadata record contains access information and display information,
  wherein the access information enables the communication module to access the individual operating parameters stored in the parameter memory and the display information describes an intended display of the individual operating parameters stored in the parameter memory within a user interface,
  wherein the communication module is arranged to read the access information and the display information from the metadata record,
  wherein the communication module is set up to query a number of the operating parameters from the parameter memory of the control electronics via the access information via the first communication link and store the queried operating parameters in the form of parameter data in the memory of the communication module, and wherein the communication module is arranged to store the display information in the form of display data in the memory of the communication module.

26. A method for operating an electronic device for an industrial electrical installation, wherein the electronic device comprises at least one electrical equipment and a communication module, and the electrical equipment has control electronics with a memory and the memory of the control electronics comprises a parameter memory in which operating parameters of the electrical equipment are stored, and wherein the communication module has a memory and is set up for a communication relationship for data communication with the control electronics of the electrical equipment via a first communication link and for data communication with an external computer device via a second communication link, the method comprising:

reading, by the communication module, a metadata record stored in the memory of the control electronics of the electrical equipment via the communication relationship between the communication module and the control electronics of the electrical equipment;

receiving, by the communication module, the metadata record which is stored in the memory of the control electronics of the electrical equipment, via the first communication link, wherein the metadata record contains access information and display information, and wherein the access information enables the communication module to access the individual operating parameters stored in the parameter memory and the display information describes an intended display of the individual operating parameters stored in the parameter memory within a user interface;

reading the access information and the display information from the metadata record;

querying a number of the operating parameters from the parameter memory of the control electronics via the access information via the first communication link and storing the queried operating parameters in the form of parameter data in the memory of the communication module; and storing the display information in the form of display data in the memory of the communication module.

27. A non-transitory computer readable medium storing a computer program thereon which performs the method according to claim 26 when the computer program is executed by a computer.

* * * * *